United States Patent
Perotti et al.

(10) Patent No.: US 10,562,431 B2
(45) Date of Patent: Feb. 18, 2020

(54) AFTERMARKET STOWABLE TRAILER RAMP

(71) Applicant: etrailer Corporation, Wentzville, MO (US)

(72) Inventors: Daniel Perotti, St. Charles, MO (US); Thomas Bross, Wentzville, MO (US)

(73) Assignee: Etrailer Corporation, Wentzville, MO (US)

( * ) Notice: Subject to any disclaimer, the term of this patent is extended or adjusted under 35 U.S.C. 154(b) by 55 days.

(21) Appl. No.: 16/031,836

(22) Filed: Jul. 10, 2018

(65) Prior Publication Data

US 2020/0017012 A1    Jan. 16, 2020

(51) Int. Cl.
*B60P 1/43* (2006.01)
*B65G 69/30* (2006.01)

(52) U.S. Cl.
CPC .............. *B60P 1/435* (2013.01); *B65G 69/30* (2013.01)

(58) Field of Classification Search
CPC .. B65G 69/30; B60P 1/43; B60P 1/435; B60P 1/438; B60P 1/6454; A61G 3/061
See application file for complete search history.

(56) References Cited

U.S. PATENT DOCUMENTS

| | | | |
|---|---|---|---|
| 3,756,440 A * | 9/1973 | Raap | B60P 1/435 414/537 |
| 5,971,465 A * | 10/1999 | Ives | B60P 1/435 296/61 |
| 5,993,135 A | 11/1999 | Wolgamood | |
| 9,764,674 B2 | 9/2017 | Friesen et al. | |

(Continued)

OTHER PUBLICATIONS

Skid Seat Attaching Bracket for Pin-End Ramp Systems https://www.discountramps.com/ramp-attaching-brackets/p/SKID-SEAT/.

(Continued)

*Primary Examiner* — Glenn F Myers
(74) *Attorney, Agent, or Firm* — Don V. Kelly; Evans & Dixon, L.L.C.

(57) ABSTRACT

A loading ramp assembly comprises a ramp body, a pivot bar, a first clamp and a second clamp. The ramp body includes a detent. The pivot bar includes a bore that receives the detent. The first clamp is disposed on the first side of the pivot bar and the second clamp is disposed on the second side of the pivot bar. The proximal end of the ramp body is rotatably connected to the pivot bar at a position on the pivot bar between the first clamp and the second clamp. The ramp body is rotatable on the pivot bar from a loading position to a stowed position and is also inwardly and outwardly slidable on the pivot bar. The first clamp and second clamp can assume a loosened configuration and a clamped configuration. In the loosened configuration the pivot bar is rotatably positionable such that the bore can assume a selected angular orientation. In the clamped configuration, the first clamp and second clamp apply a clamping force to the pivot bar that holds the pivot bar in a clamped position and maintains the bore in the selected angular orientation. One or more fasteners removably fasten the clamps to the floor. When the ramp body is rotated about the pivot bar and the detent is aligned with the bore, the detent engages the bore in the bore's selected angular orientation and holds the ramp body in the stowed position.

8 Claims, 13 Drawing Sheets

(56) References Cited

U.S. PATENT DOCUMENTS

2006/0045703 A1\* 3/2006 Dougherty .............. B60P 1/435
                                                                                         414/537
2018/0257537 A1\* 9/2018 DeSimone .............. B60P 1/435

OTHER PUBLICATIONS

Aluminum Skid Seat (Trailer Adaptor)36" Wide with Locking Rod (Single Piece) https://www.myteeproducts.com/aluminum-skid-seat-trailer-adaptor-36-wide-with-locking-rod-single-piece.html.
Rack'em Fitz-All Enclosed Trailer Ladder Rack Rackem Trailer Cargo Organizers RA-28 https://www.etrailer.com/Enclosed-Trailer-Parts/Rackem/RA-28.html.
Malone TopTier Load Bar Kit for Utility Trailers—250 lbs https://www.etraler.com/Trailer-Cargo-Organizers/Malone/MPG493.html.
Thule Traverse Roof-Rack Foot Pack Thule Roof Rack TH480 https://etrailer.com/Roof-Rack/Thule/TH480.html.

\* cited by examiner

AFTERMARKET STOWABLE TRAILER RAMP

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to truck and trailer accessories and more specifically relates to loading ramps useful for trucks and trailers.

BACKGROUND OF THE INVENTION

Utility trailers are commonly used pieces of equipment that augment the carrying capacity of motor vehicles, typically pick-up trucks. Outdoor service businesses, like construction and landscaping companies utilize utility trailers to transport equipment such as mowers, tractors, trenchers and back hoes. Utility trailers are also used in non-commercial situations such as by motor sport enthusiasts to haul cars, motorcycles and all-terrain vehicles.

The typical utility trailer has a forward end and a rear end. The forward end of the trailer is equipped with a tongue coupler shaped and sized to engage the trailer hitch ball projecting from the hitch receiver of a towing vehicle. The bed of the trailer is made from wood planks extending from the forward end to the rear end. The planks are supported underneath by metal joists that are affixed to a rectangular frame that surrounds the planks. The frame is attached to axle-mounting structure that holds one or more axles upon which are mounted the trailer's wheels.

Utility trailers come in two basic variations: with a permanently affixed ramp mechanism or without a ramp mechanism. In the case of the former, two types of permanently affixed ramp mechanisms are used. The first is a vertically pivoting unitary tailgate ramp affixed to the rear end of the trailer. The tailgate ramp stows in a vertically upright position during hauling of equipment. The tailgate ramp pivots down from the rear end of the trailer in order to load equipment on and off the rear of the trailer. Typically, the tailgate ramp includes a heavy gauge mesh welded to an angle iron or tube steel frame. The tailgate ramp has welded male hinge pins that mate with female hinges welded on the trailer. By virtue of the welding attachments, the tailgate ramp constitutes a permanent attachment to the trailer. Moreover, by virtue of its requisite welded attachments, the heavy gauge mesh tailgate cannot be easily or practically added to a utility trailer by the typical end user. Being of a unitary structure, tailgate ramps do not work well with uneven ground because of their rigid frame.

A second type of permanently affixed ramp mechanism found on utility trailers is that consisting of two individually pivoting ramps affixed to the back of the utility trailer. As compared to the tailgate ramp that spans the entirety of the width of the rear of the trailer each ramp is significantly narrower. In this respect, each ramp is slightly wider than the width of the tires of the equipment expected to be hauled. Like the tailgate ramp, these ramps stow in a vertical position during hauling. Each ramp can be pivoted down to ground level in order to move equipment on and off the trailer. Because each ramp separately pivots, this type of ramping mechanism is good where equipment is often unloaded on unpaved surfaces that have slight variances in height. Also, because each ramp is significantly narrower than the width of the trailer, each ramp is more robust, carrying capacity-wise, than the framed mesh tailgate ramp. Because construction and landscaping equipment have varying axle tracks, on some utility trailers, the ramps are often permanently attached to slide rails welded to the back of the trailer. This mounting technique allows the ramps to move inboard and outboard along the width of the trailer to accommodate equipment having different axle tracks.

As noted, utility trailers are often sold without permanently affixed ramp mechanisms. One reason utility trailer purchasers may not want permanently installed ramp mechanisms is that when the ramps are in the stowed position, they add to the vertical height of the trailer. This additional height can restrict storage options for the trailer. Another reason end users may not want a permanently affixed ramp mechanism is the aerodynamic drag caused by hauling the trailer with the ramping mechanism in its vertically upright stowed position. The trailer must be hauled in this configuration even in situations where the trailer is empty or is loaded with equipment not needing the ramps. Hence, in many situations end users of the trailer do not need the ramp mechanism, but are compelled to haul the utility trailer with the ramp mechanisms because they are permanently affixed to the trailer.

Thus, many of the utility trailers in use do not have permanently affixed ramp mechanisms. That said, there are times when the owners of such trailers desire to load wheeled equipment onto the trailers. For these situations, there are aftermarket ramps that can be purchased to help load wheeled equipment. With one type of aftermarket ramp, the ramp includes one or more tongues (extended plates) that rest on the deck of the rear end of the trailer. When loading is complete, the ramp is simply lifted off the deck and placed on the trailer. In another type of aftermarket ramp, the forward end of the ramp includes hooks or is shaped like a hook. The hooks or hook hang onto angle iron or a rail welded to the back of the trailer. When loading is complete, the ramp is simply lifted off the angle iron or rail and placed on the trailer.

There are several deficits with these types of ramps. With respect to the ramp that uses tongues to rest on the trailer deck, that type of ramp is only useful for lighter equipment and not for situations where the ramp may shift during use. If the ramp were to shift, the one or more tongues may come off of the deck causing the load to drop. Another deficit with these types of ramps is that after use, the ramps must be stored on the trailer deck and secured for travel. This takes up space. Second, unless locked to the trailer, the ramps are subject to theft. In the case of the ramp with a hook end, the rear of the trailer must be modified to include the angle iron or rail to receive the hook end of the ramp. That additional structure projects from the back of the trailer. That projection is often undesirable from the standpoint of ergonomics or safety because it can present an obstacle or hazard to those working around the rear end of the trailer.

The foregoing features and deficits seen with regard to ramping mechanisms for utility trailers may also be seen to a lesser extent with respect to any truck with a cargo floor. Such truck may take the form of an open flatbed truck or a truck having an enclosed cargo area. Accordingly, for inclusiveness purposes, the term "cargo vehicle" is used herein to collectively refer to utility trailers and trucks with cargo floors. In view of the deficits of the prior art permanently affixed ramp mechanism and portable deck ramps when used with cargo vehicles, an improved ramp solution is desired.

SUMMARY OF THE INVENTION

In a preferred embodiment, the present invention is directed to a loading ramp assembly for attachment to a cargo vehicle having a floor. As is typical of cargo vehicles, the floor of the vehicle terminates in a loading edge that spans between opposed side walls on the vehicle. In most cases, the loading ramp assembly will be used to load four-wheeled vehicles of standard wheel arrangement (i.e., having two wheels with a common axis in front and two with a common axis in back). Hence, when loading a four-wheeled vehicle, two loading ramp assemblies will be used in parallel arrangement. Each preferred embodiment loading ramp assembly comprises a ramp body, a pivot bar, a first clamp and a second clamp. The ramp body includes a detent. The pivot bar includes a bore sized and shaped to receive the detent.

The first clamp is disposed on a first side of the pivot bar. The second clamp is disposed on a second side of the pivot bar. The ramp body has a proximal end and a distal end. The proximal end of the ramp body is rotatably connected to the pivot bar at a position on the pivot bar between the first clamp and the second clamp. The ramp body is also slidable on the pivot bar so that once parallel assemblies are attached to the floor of the cargo vehicle, the span between the assemblies can be adjusted simply by sliding the ramp body on the pivot bar. Thus, each ramp body can be indexed on its pivot bar so that the span between the ramp bodies correlates to that of the axle track of the vehicle to be loaded.

The ramp body can rotate on the pivot bar from a loading position to a stowed position. The first clamp and second clamp can assume a loosened configuration and clamped configuration. In the loosened configuration the pivot bar is rotatably positionable such that the bore can assume a selected angular orientation vis-à-vis the axis running the length of the pivot bar. In the clamped configuration, the first clamp and second clamp apply a clamping force to the pivot bar and hold the pivot bar in a clamped position. In this clamped position, the first clamp and second clamp maintain the bore in the selected angular orientation.

The first clamp and second clamp each include one or more fasteners. The one or more fasteners removably fasten the first clamp and second clamp to the floor. When the ramp body is rotated about the pivot bar a certain extent, the detent will engage the bore fixed in the selected angular orientation. The selected angular orientation corresponds to the desired stow position of the ramp body. Therefore, when the detent engages the bore, the assembly holds the ramp body in the stowed position.

The preferred embodiment ramp assembly can be removably secured to a utility trailer by securing the fasteners to the floor of the cargo vehicle near its loading edge. When installed in this fashion, the pivot bar may sit proud of the floor and thus there may be a vertical distance between the proximal end of the ramp body and the cargo vehicle floor. To allow for the easy and smooth rolling of a wheeled vehicle between the floor of the cargo vehicle and the ramp body, the described embodiment loading ramp assembly preferably also includes a transition flap. The transition flap is pivotably connected to the proximal end of the ramp body. When the ramp body is in the loading position, the transition flap extends down from the ramp body to the floor.

DETAILED DESCRIPTION

Figure 1:
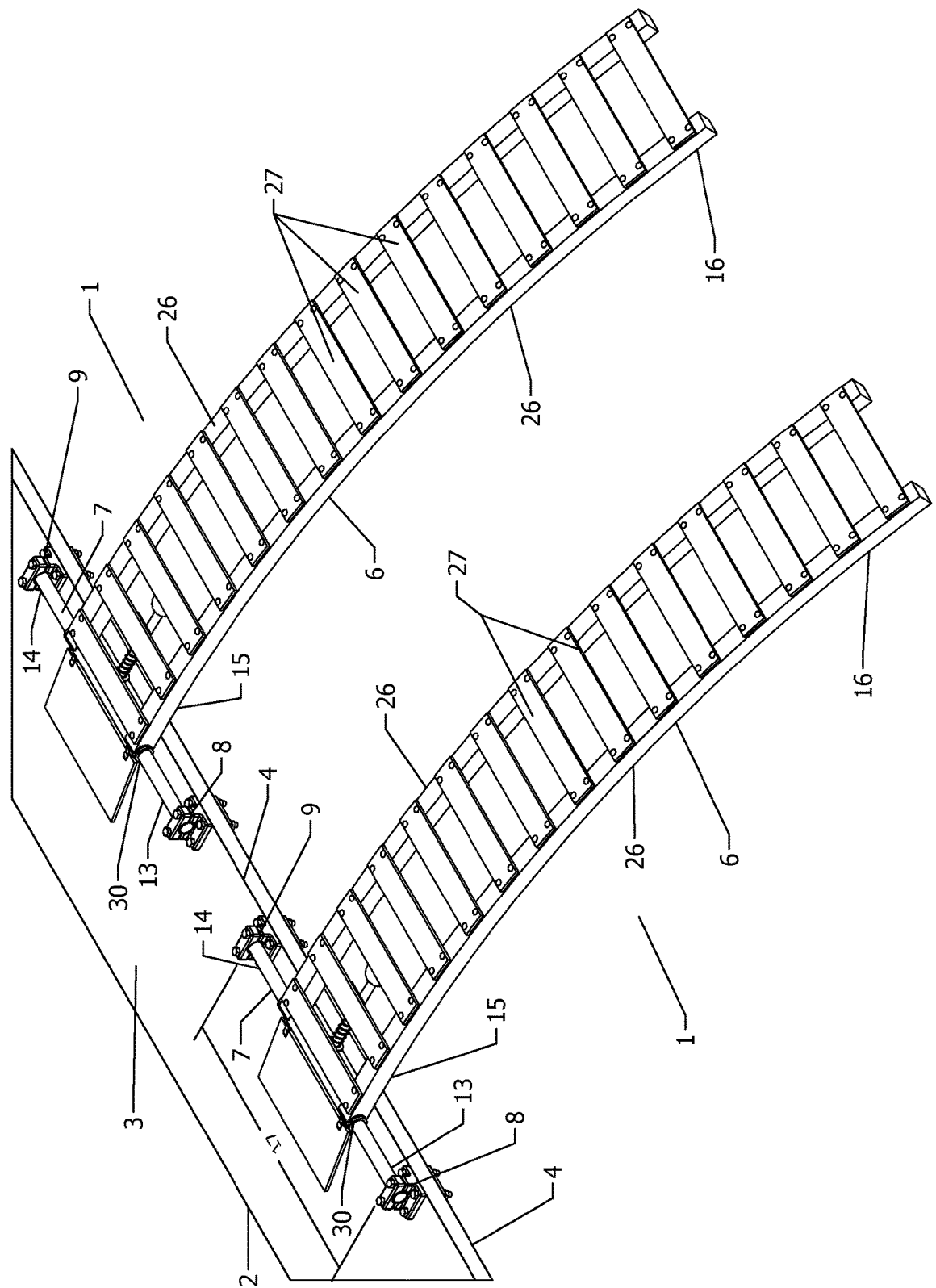
FIG. 1 is a perspective view of two embodiment loading ramp assemblies removably attached to the floor of a cargo vehicle. The loading ramp assemblies are in the loading position.
Figure 2:
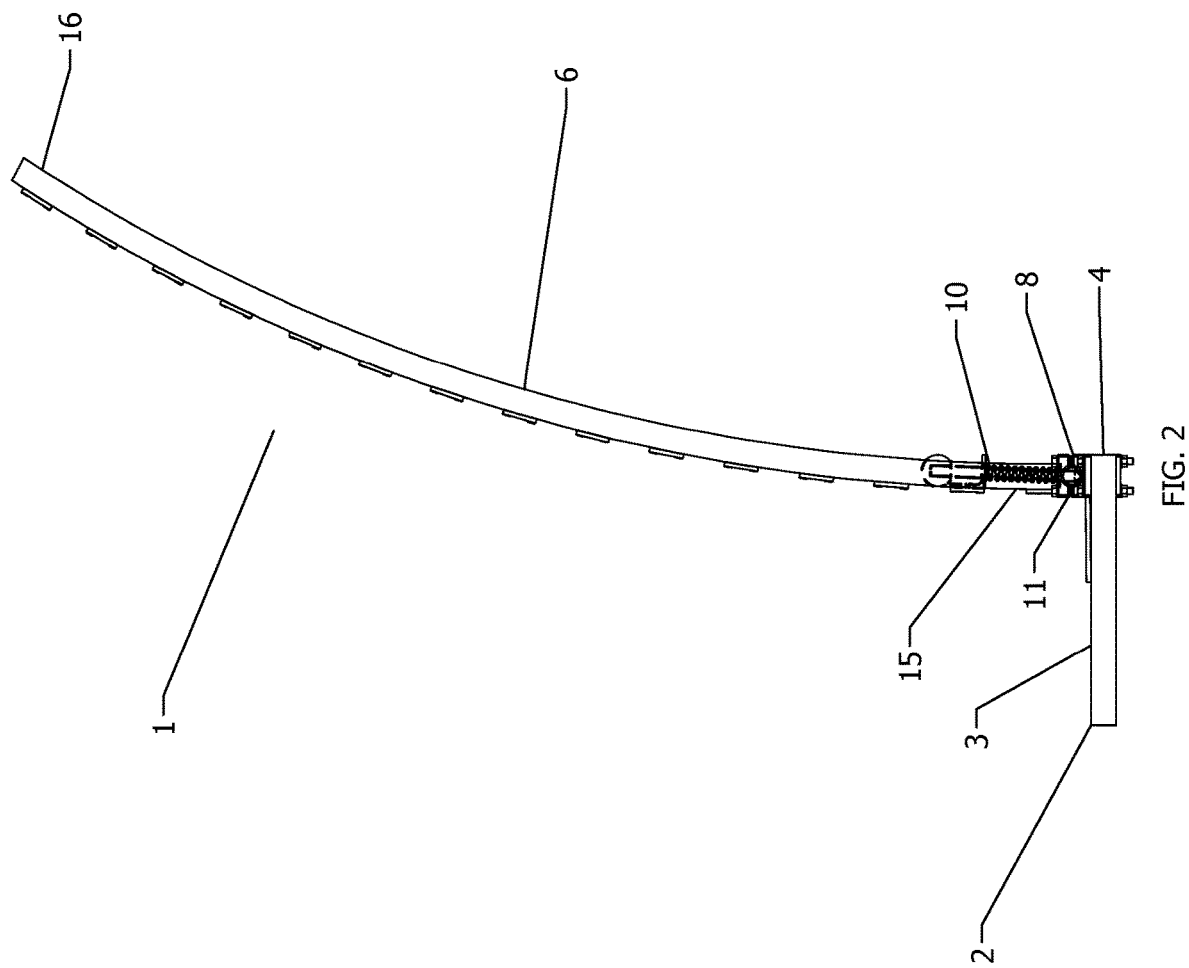
FIG. 2 is a side elevation view of an embodiment loading ramp assembly removably attached to the floor of a cargo vehicle. The detent of the ramp body is engaged with the bore on the pivot bar, thereby holding the ramp body in the stowed position.
Figure 3:
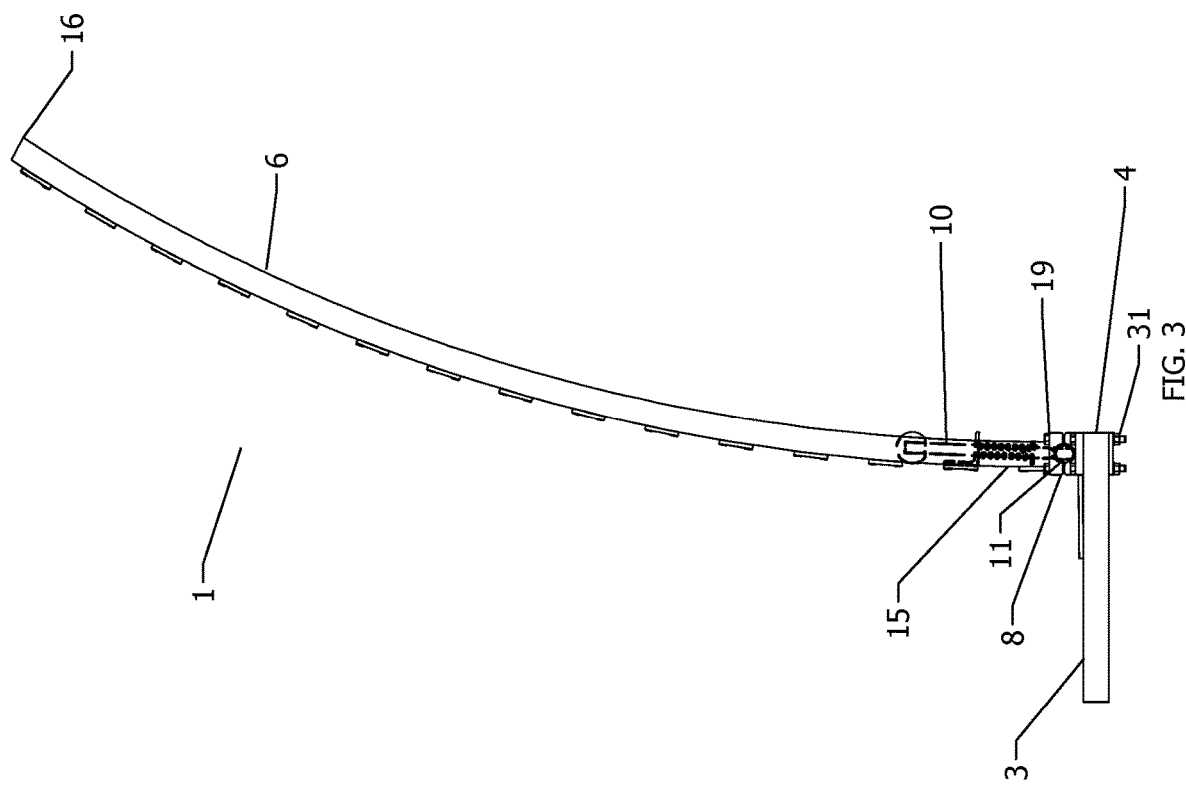
FIG. 3 is a side elevation view of an embodiment loading ramp assembly removably attached to the floor of a cargo vehicle. The loading ramp is in a near stowed position with the ramp body vertically pivoted about the pivot bar, but the detent of the ramp body is not engaged with the bore of the pivot bar.
Figure 4:
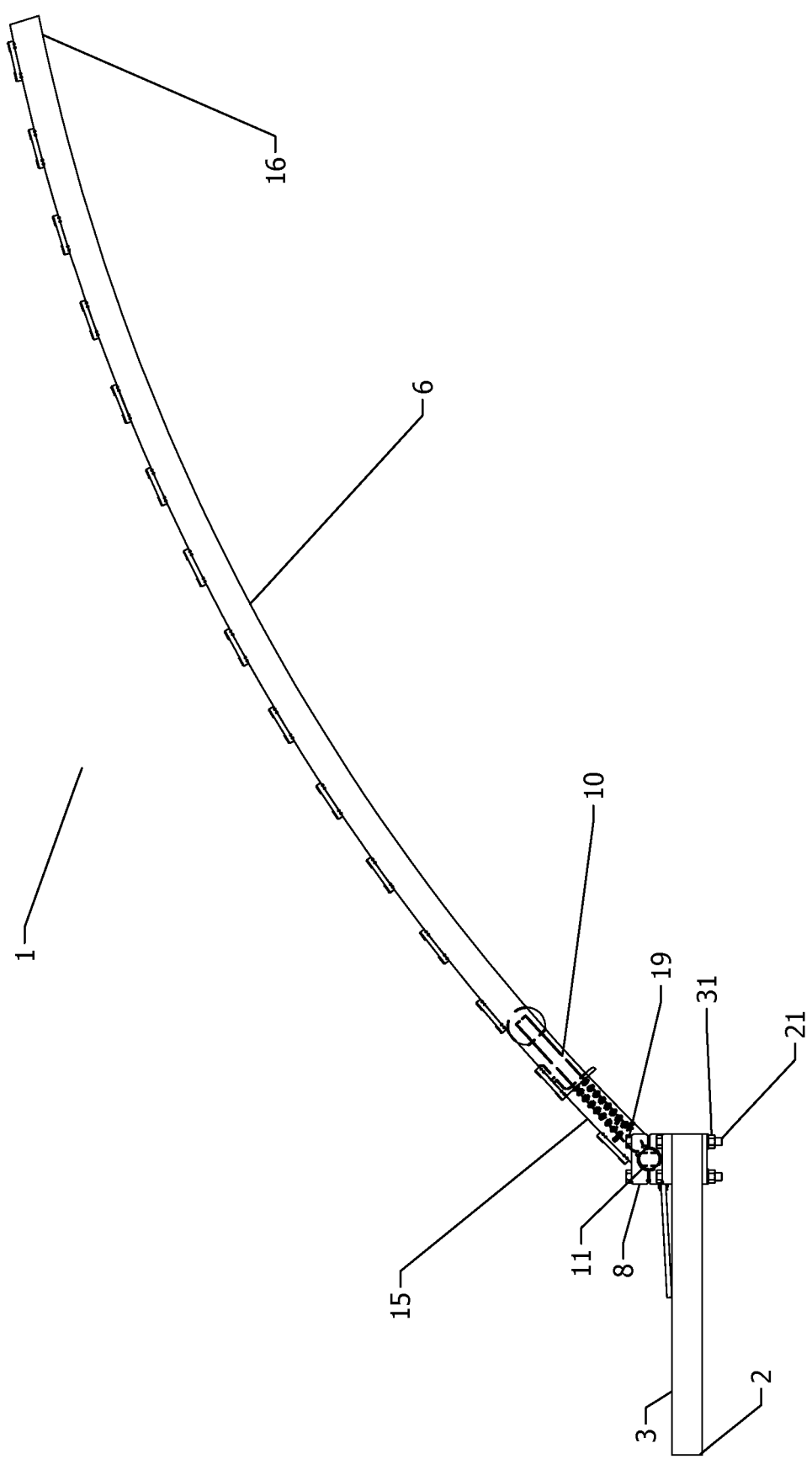
FIG. 4 is a side elevation view of an embodiment loading ramp assembly removably attached to the floor of a cargo vehicle. The loading ramp has been pivoted about the pivot bar and is in a position between its loading position and stowed position. The detent of the ramp body is not engaged with the bore of the pivot bar.
Figure 5:
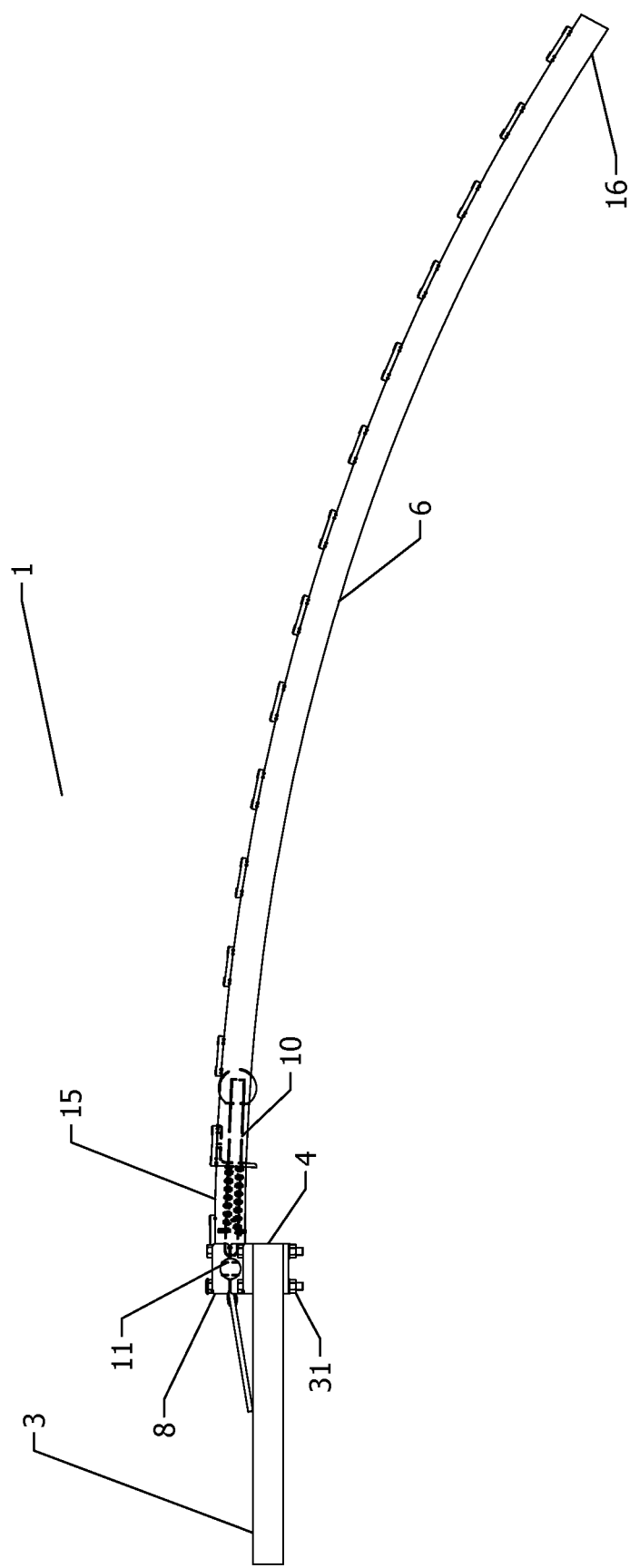
FIG. 5 is a side elevation view of an embodiment loading ramp assembly removably attached to the floor of a cargo vehicle. The loading ramp has been pivoted about the pivot bar and is in a loading position whereby its proximal end is on the floor of the cargo vehicle and its distal end is on the ground. The detent of the ramp body is not engaged with the bore of the pivot bar.
Figure 6:
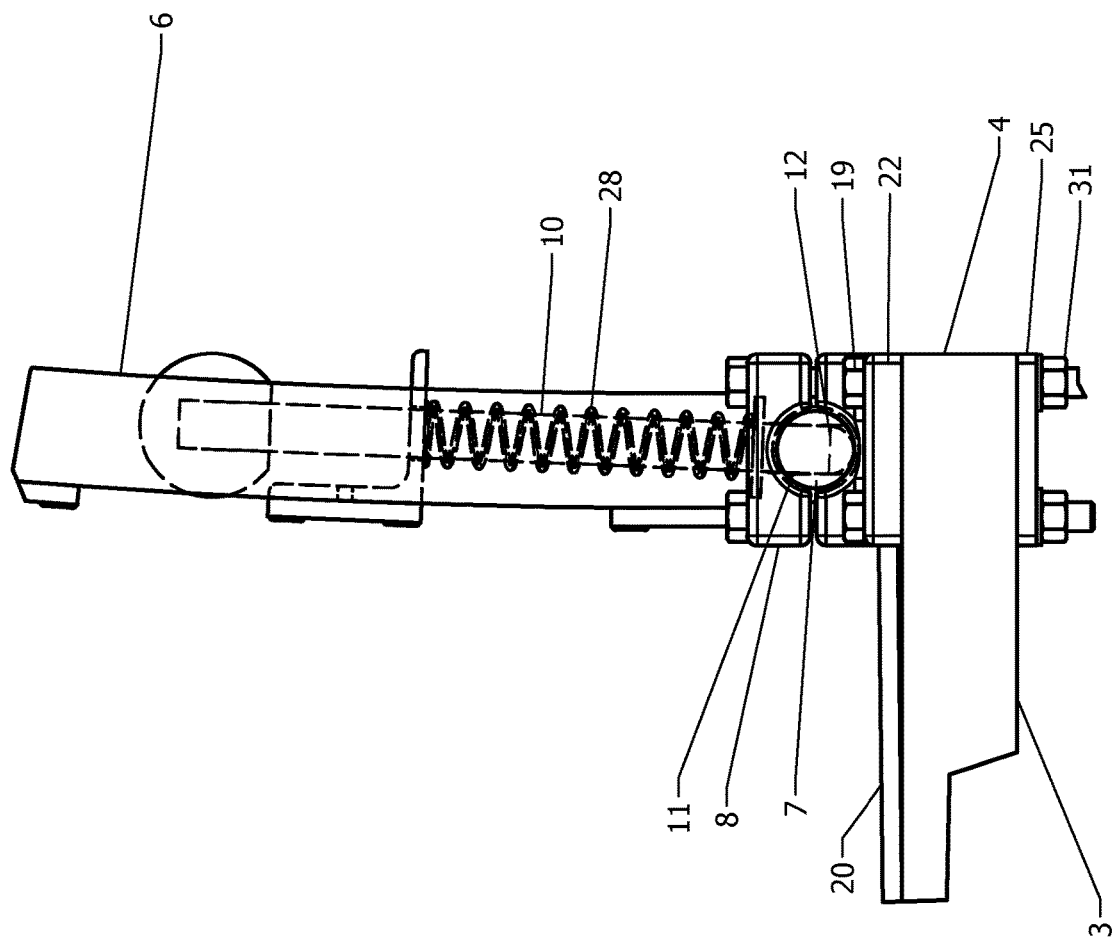
FIG. 6 is a detail side elevation view showing the interaction and engagement of the detent of the ramp body with the bore of the pivot bar when the ramp body is pivoted into the stow position.
Figure 7:
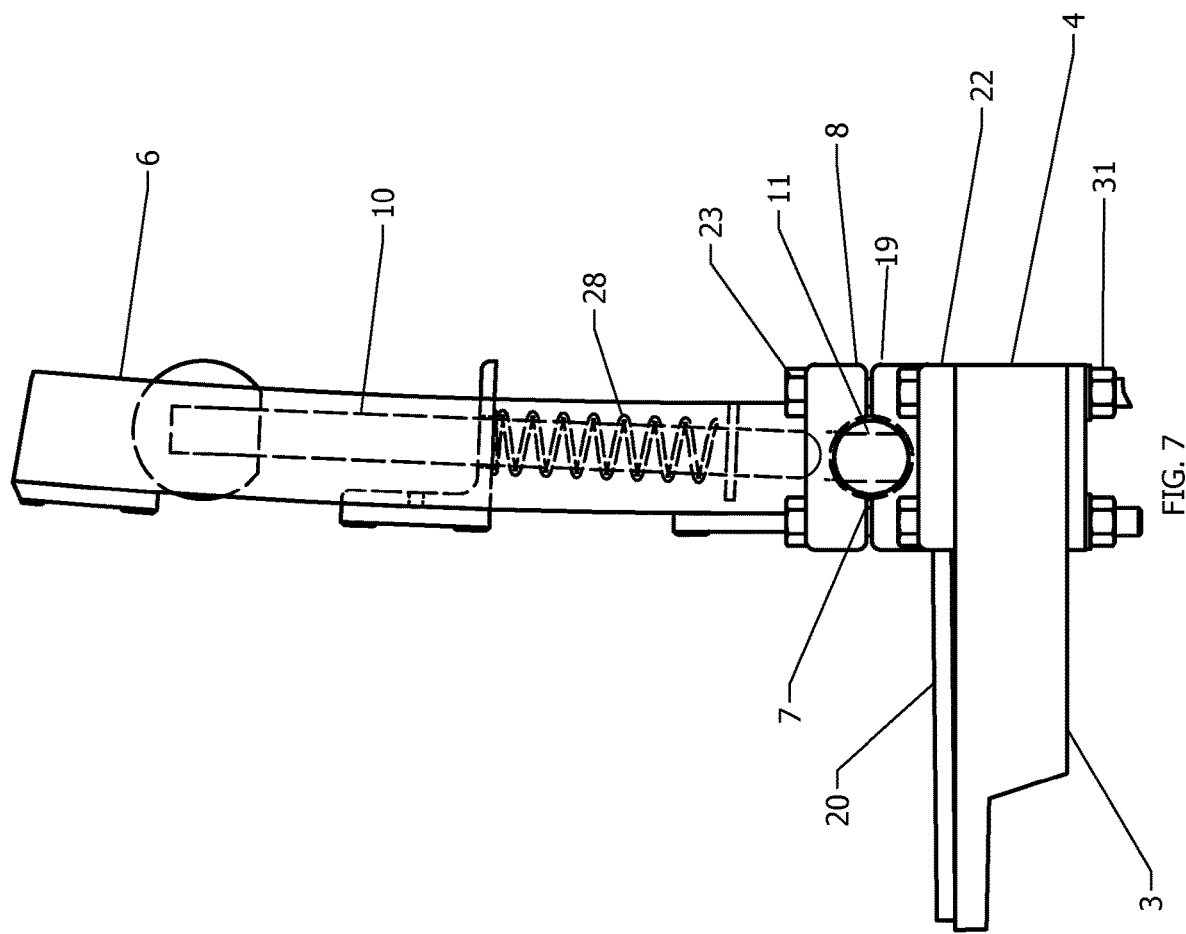
FIG. 7 is a detail side elevation view showing the interaction of the detent of the ramp body with the bore of the pivot bar when the ramp body is in a near stow position. For the ramp body to be placed in the stowed position, the ramp body must be slidably moved along the pivot bar until the detent aligns with bore.
Figure 8:
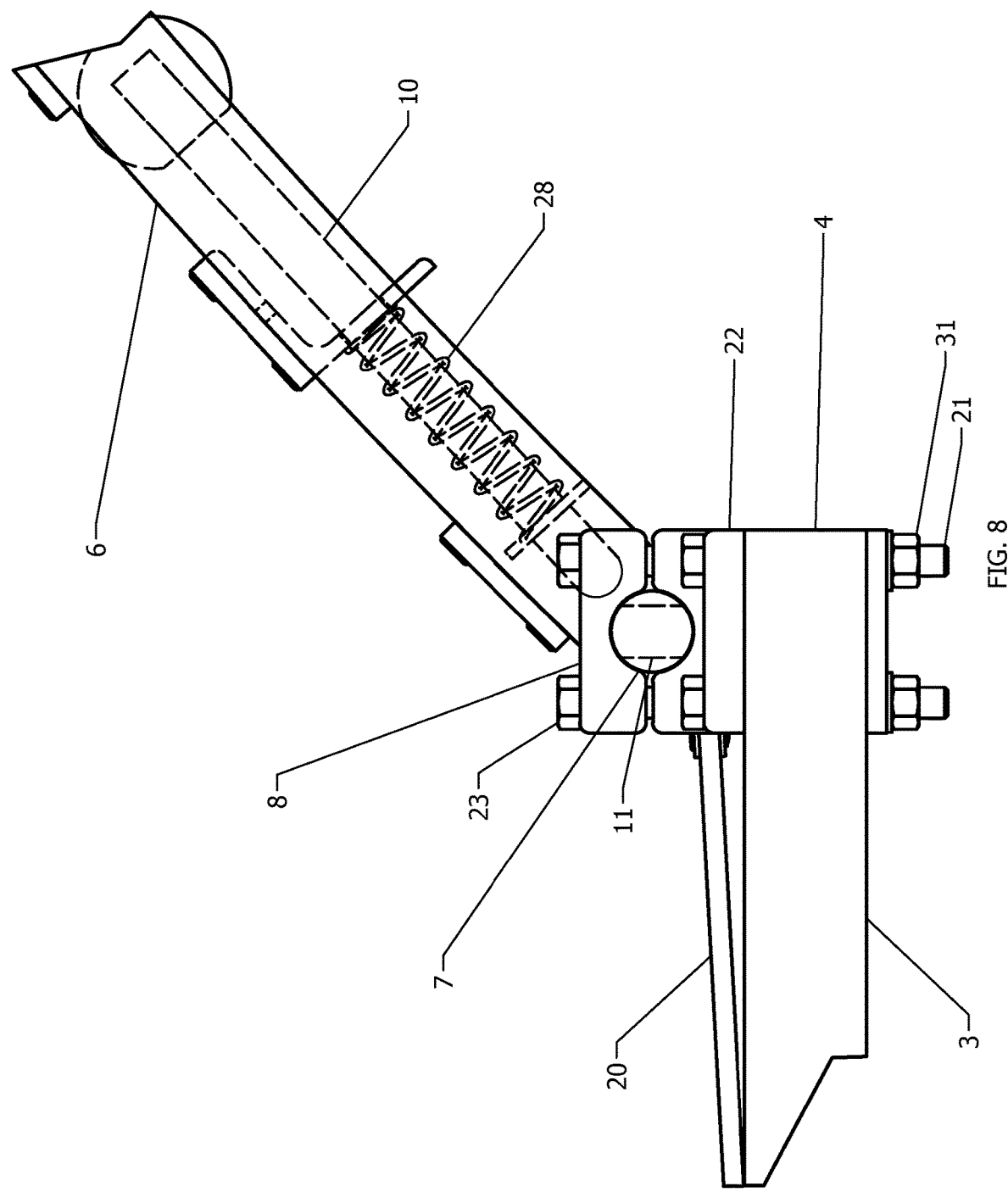
FIG. 8 is a detail side elevation view showing the position of the detent of the ramp body relative to the bore of the pivot bar when the ramp body is pivoted into a position between the stow position and the loading position.
Figure 9:
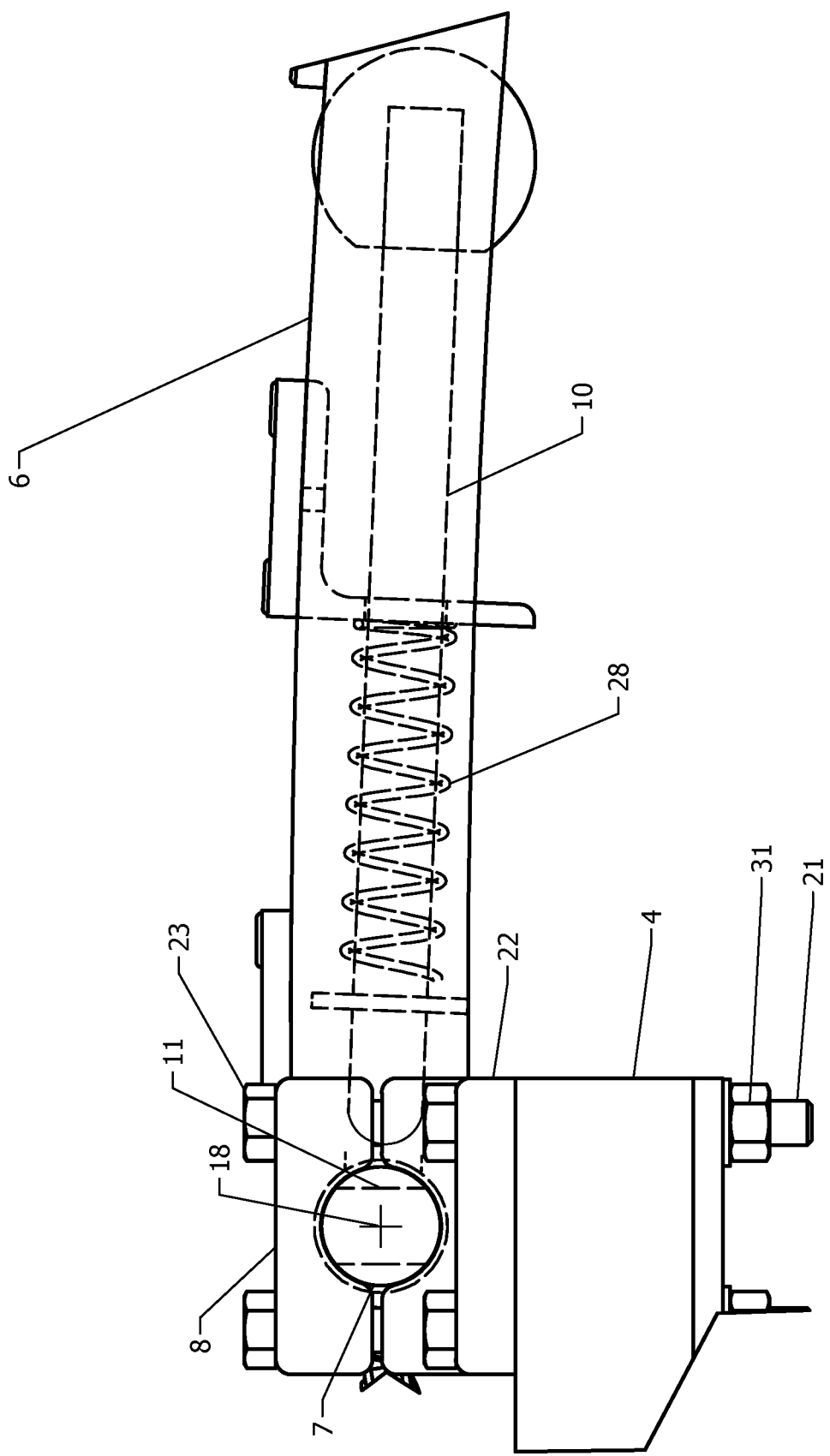
FIG. 9 is a detail side elevation view showing the position of the detent of the ramp body relative to the bore of the pivot bar when the ramp body is pivoted into the loading position.
Figure 10:
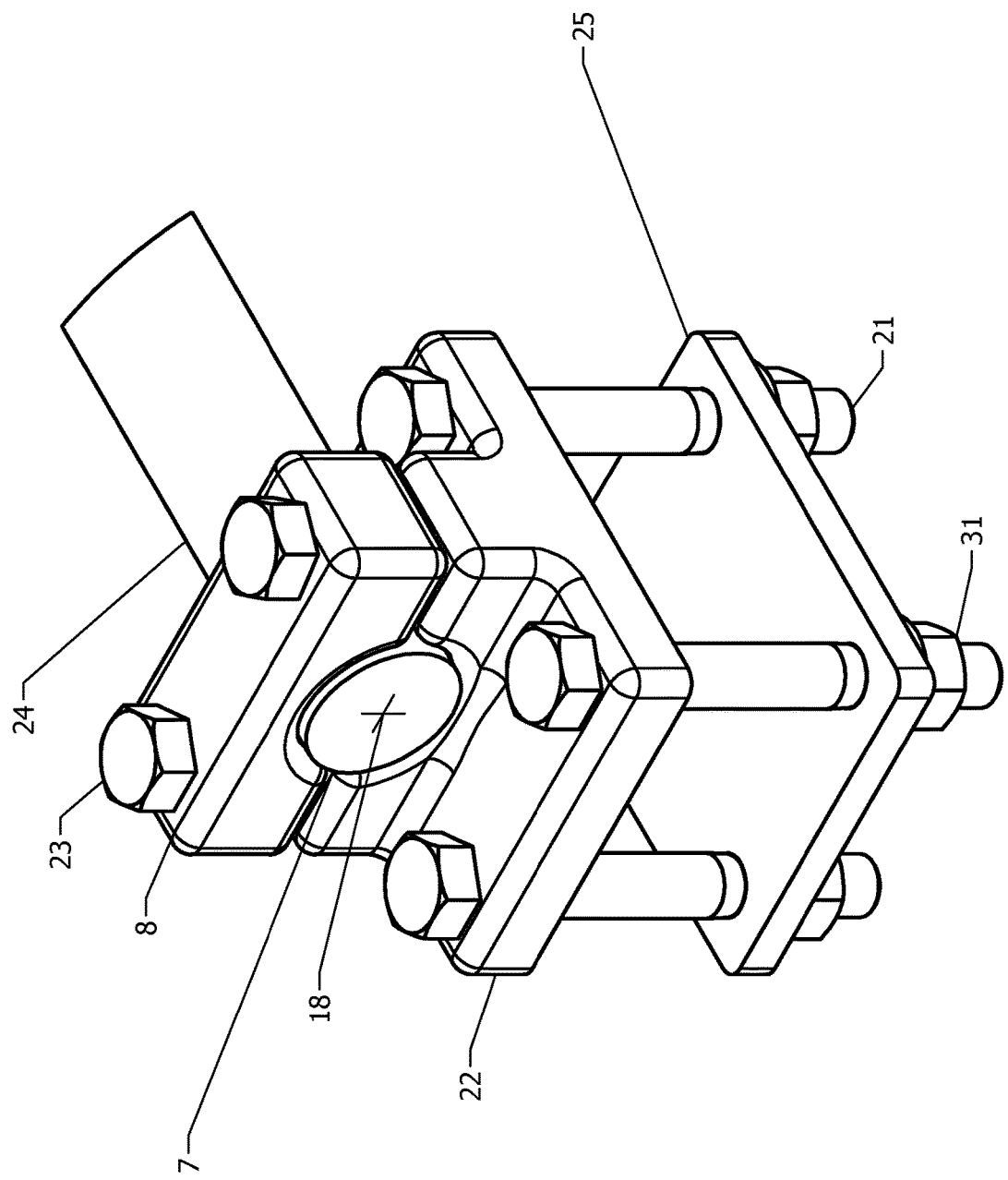
FIG. 10 depicts the structure of a preferred embodiment clamp for use with the preferred embodiment loading ramp assembly of the present invention.
Figure 11:
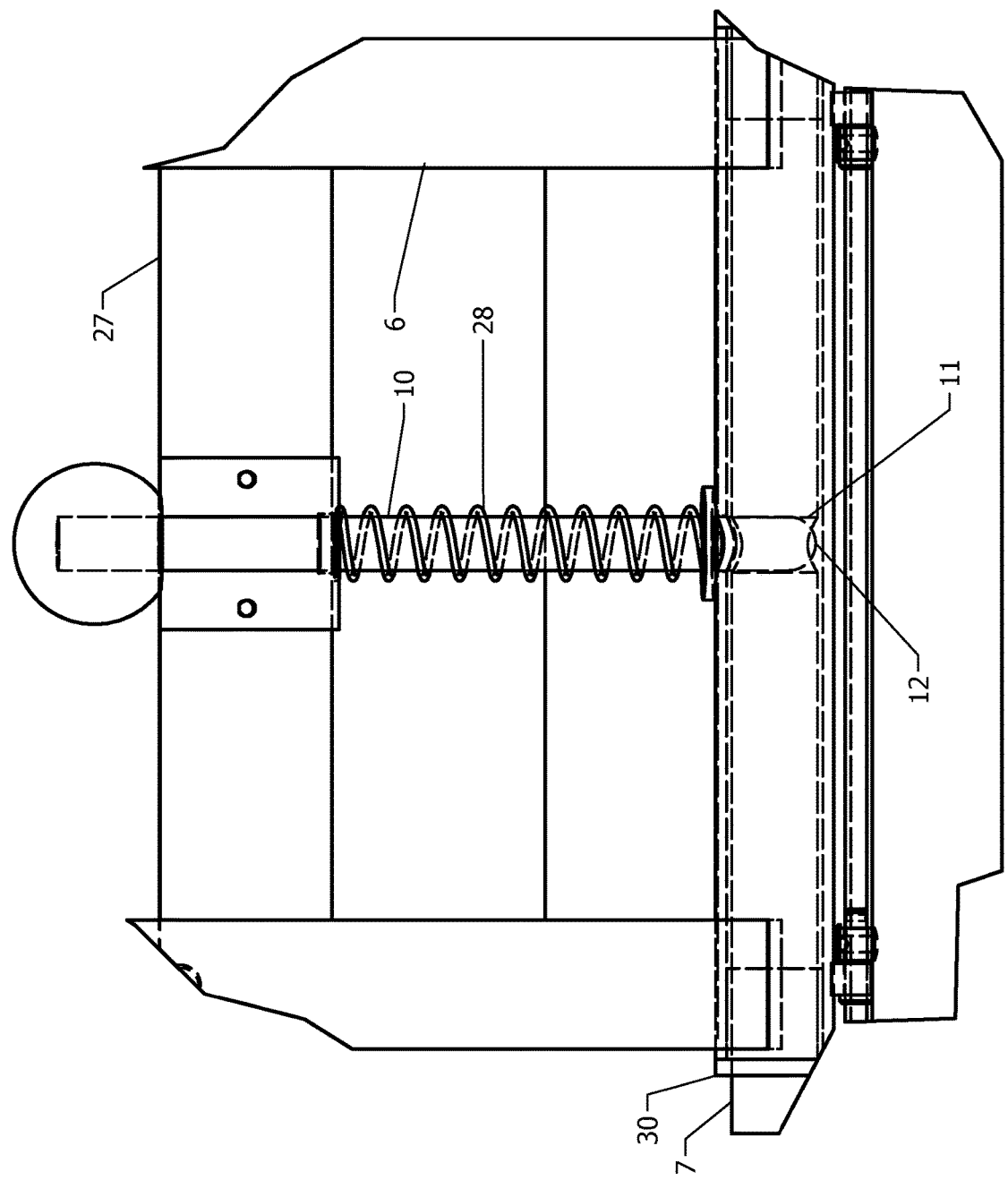
FIG. 11 is a detail elevation view of the underside of the embodiment ramp assembly showing the rotatable and slidable connection of the ramp body to the pivot bar. The pivot bar is shown in phantom view to demonstrate the interaction of the detent and bore when the bore and detent are engaged.
Figure 12:
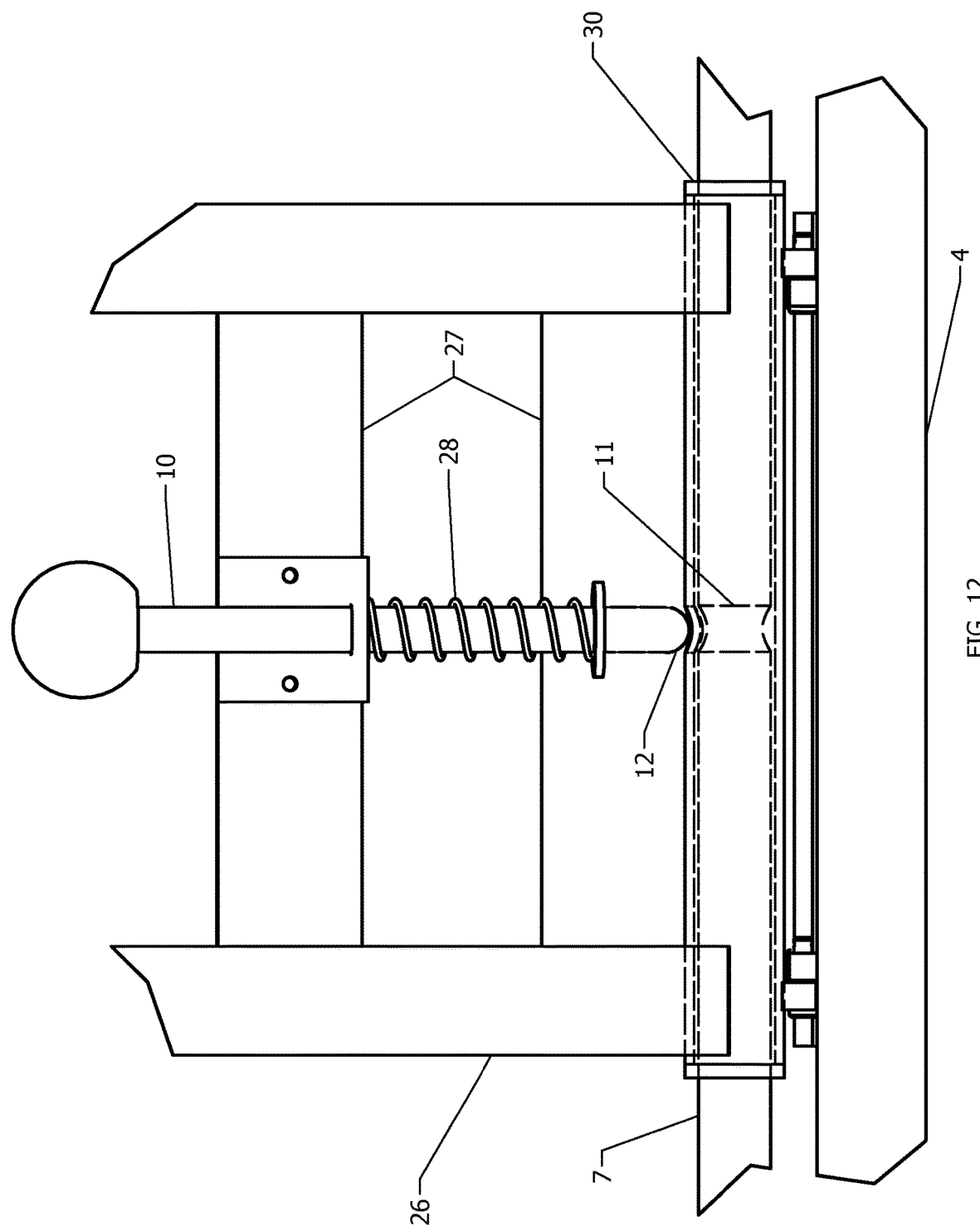
FIG. 12 is a detail elevation view of the underside of the embodiment ramp assembly showing the rotatable and slidable connection of the ramp body to the pivot bar. The pivot bar is shown in phantom view to demonstrate the interaction of the detent and bore when the end of the detent is aligned with, but extracted from, the bore.
Figure 13:
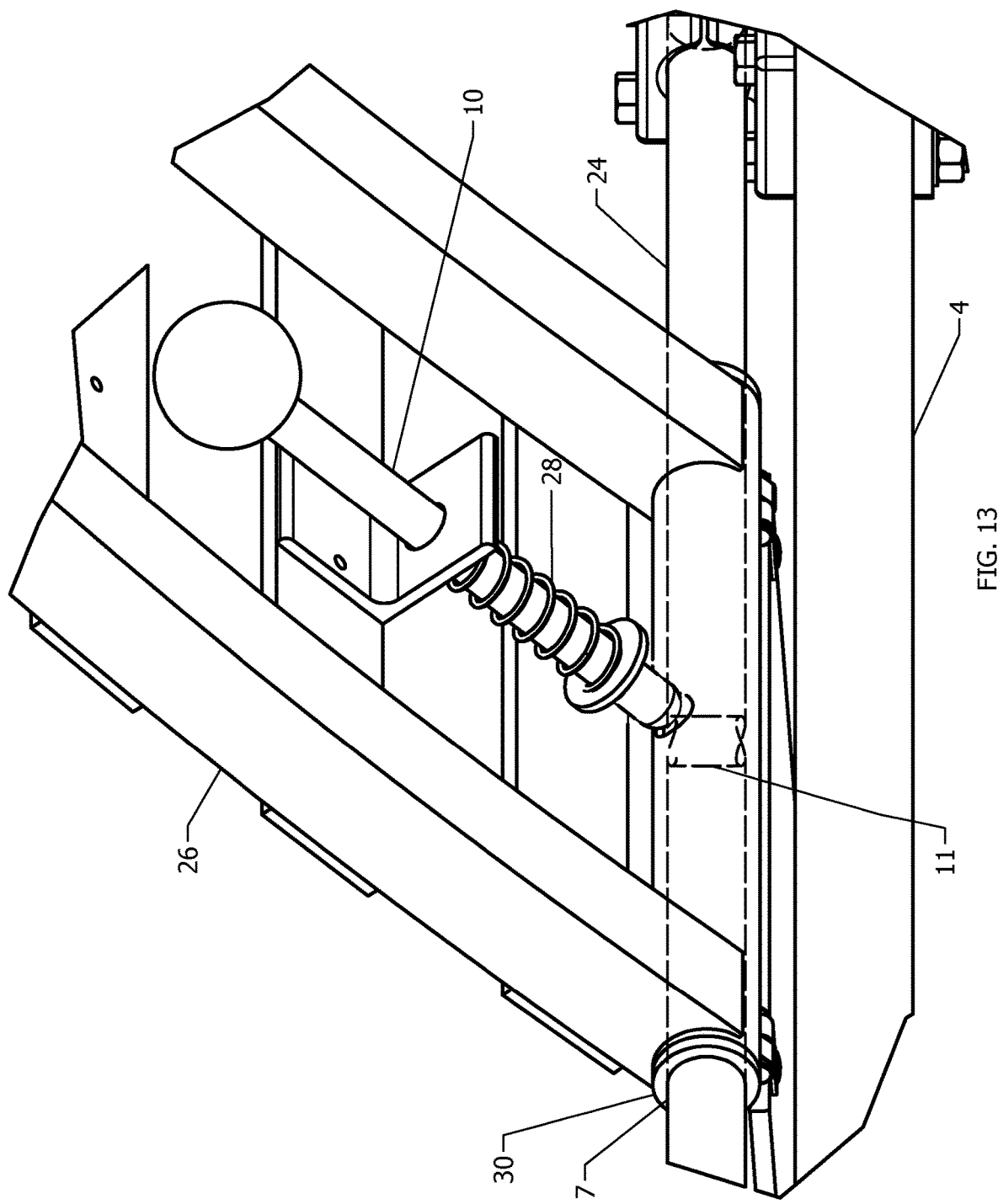
FIG. 13 is a detail perspective view of the underside of the embodiment ramp assembly showing the rotatable and slidable connection of the ramp body to the pivot bar. The end of the detent is not aligned with the bore and is resting on the outer surface of the pivot bar.

FIGS. 1-13 depict a preferred embodiment of the present invention loading ramp assembly 1 along with its preferred features. In FIG. 1 two loading ramp assemblies 1 are shown attached to the back of cargo vehicle 2. The loading ramp assemblies 1 are in the loading position. In practical use, cargo vehicle 2 will normally be situated upon a roadway surface considered horizontal in reference to the user installing the loading ramp assembly 1. Thus, the directional terms "vertical" and "horizontal" and the like may be used to describe the loading ramp assembly 1 and its components with respect to the orientation illustrated in FIGS. 1-13 and are employed merely for the purposes of clarity and illustration. For example, FIG. 1 shows two loading ramp assemblies 1 in their loading position. In the orientation shown in FIG. 1, each loading ramp assembly 1 projects "horizontally" out off loading edge 4 of cargo vehicle 2. In FIGS. 2 and 6, ramp body 6 is in a pivoted vertical position relative to floor 3. The terms "vertical" and "vertically" mean a direction substantially normal to or away from floor 3 on which loading ramp assembly 1 is installed. The terms "horizontal" and "horizontally" mean a direction substantially parallel to that of floor 3 on which loading ramp assembly 1 is installed. The terms "substantially perpendicular" and "substantially parallel" mean with respect to a described orientation, structure or force, the stated orientation, structure or force is sufficiently perpendicular or parallel such that performance of the described orientation, structure or force, from the perspective of one with ordinary skill in the art, is the same as though the orientation, structure or force is precisely perpendicular or parallel. The directional terms "proximal" and "distal" and the like are used herein with respect to the described loading ramp assembly to refer to positions and locations on the loading ramp assembly relative to loading edge 4.

A preferred embodiment loading ramp assembly 1 of the present invention will now be explained with reference to the figures. As shown in FIGS. 1-13, in one aspect the present invention is directed to a loading ramp assembly 1 for attachment to a cargo vehicle 2 having a floor 3. As is typical of cargo vehicles, floor 3 of vehicle 2 terminates in rear loading edge 4. Loading edge 4 will typically span between opposed side walls (not shown) on vehicle 2. Preferred embodiment loading ramp assembly 1 comprises ramp body 6, pivot bar 7, first clamp 8 and second clamp 9. In the depicted embodiment, ramp body 6 is constructed with a ladder-type arrangement of rails 26 and slats 27. This is merely exemplary. Ramp body 6 includes detent 10. Pivot bar 7 includes bore 11 sized and shaped to receive tip 12 of detent 10.

First clamp 8 is disposed on first side 13 of pivot bar 7. Second clamp 9 is disposed on second side 14 of pivot bar 7. Ramp body 6 has proximal end 15 and distal end 16. Proximal end 15 of ramp body 6 is rotatably connected via bearing 30 to pivot bar 7 at a position on pivot bar 7 between first clamp 8 and second clamp 9. Ramp body 6 can rotate on pivot bar 7 from a loading position (shown in FIG. 1) to a stowed position (shown in FIG. 2). First clamp 8 and second clamp 9 can assume a loosened configuration and clamped configuration. In the loosened configuration, pivot bar 7 is rotatably positionable such that bore 11 can assume a selected angular orientation vis-à-vis axis 18 running the length 17 of pivot bar 7. In the clamped configuration, first clamp 8 and second clamp 9 apply a clamping force to pivot bar 7 and hold pivot bar 7 in a clamped position. In this clamped position, first clamp 8 and second clamp 9 maintain bore 11 in the selected angular orientation.

When ramp body 6 is rotated about pivot bar 7 a certain extent, detent 10, when aligned with bore 11 positioned on the length of pivot bar 7, will engage bore 11 fixed in the selected angular orientation. The selected angular orientation corresponds to the desired stow position of ramp body 6 and, therefore, when detent 10 engages bore 11, pivot bar 7 holds ramp body 6 in the stowed position.

First clamp 8 and second clamp 9 each include one or more fasteners, which are shown generally at 19. One or more fasteners 19 removably fasten first clamp 8 and second clamp 9 to floor 3. In the depicted embodiment, exemplary fastener 19 includes integrated base plate 22, one or more through-bolts 21, nut 31 (for each through-bolt) and face plate 25. For the most secure attachment using the embodiment fastener 19, face plate 25 should be employed underneath floor 3 as part of the fastening system to broaden the clamping force applied to the floor. Through-bolts 21, nuts 31, face plate 25 and base plates 22, are non-limiting examples of components that can serve as fasteners 19. Other mechanical fastening methods may be used and the fastener 19 components shown in the drawings are merely exemplary. The preferred embodiment ramp assembly 1 can be removably secured to a cargo vehicle such as a utility trailer by securing fasteners 19 to floor 3 of cargo vehicle 2 near loading edge 4.

As shown in the drawings, ramp body 6 includes bearing or sleeve 30 through which pivot bar 7 is inserted. By virtue of this arrangement, once clamps 8, 9 are fastened to floor 3 and clamps 8, 9 clamp upon pivot bar 7, ramp body 6 is not removable from cargo vehicle 2, except by way of loosening clamps 8, 9. However, in the depicted preferred embodiment, clamps 8, 9 can only be placed into or removed from the clamped configuration through use of one or more tool-driven fasteners (bolts) 23, which effectively makes the ramp body theft resistant. Similarly, in the depicted embodiment, fasteners 19 employ tool driven through-bolts 21 and nuts 31, which effectively make each loading ramp assembly 1 theft resistant.

When ramp assembly 1 is installed to cargo vehicle 2 in the described fashion, pivot bar 7 may sit proud of floor 3 and thus there may be a vertical distance between proximal end 15 of ramp body 6 and floor 3 of cargo vehicle 2. To allow for the easy and smooth rolling of a wheeled vehicle between floor 3 of cargo vehicle 2 and ramp body 6, described embodiment loading ramp assembly 1 preferably also includes transition flap 20. Transition flap 20 is pivotably connected to proximal end 15 of ramp body 6. When ramp body 6 is in the loading position, transition flap 20 extends down from ramp body 6 to floor 3.

The features and benefits of the invention will now be explained in additional detail. Typically, the embodiment loading ramp assembly 1 will be installed in pairs so that 4-wheeled vehicles can be loaded onto cargo vehicle 2. Thus, in another respect, the invention is an aftermarket trailer ramp system that can be added to almost any trailer. Each loading ramp assembly 1 of the system will attach through the floor 3 (a/k/a "deck") of an existing trailer via fasteners 19, which include through-bolt connections 21 and bases 22 of supplied clamps 8, 9.

Clamps 8, 9 will secure pivot bar 7, which will serve as an index bar that will allow installed ramp bodies 6 to index to a narrower or wider relative position depending on the axle track of the vehicle to be loaded upon the cargo vehicle. Each ramp body 6 is thus slidably and rotatably connected to pivot bar 7. Ramp body 6 will be able to rotate around pivot bar 7 from a stowed position to a deployed position. Ramp body 6 will be retained in the stowed position by retaining detent 10, which is preferably spring (shown as reference numeral 28) actuated. Bore 11 is shaped and sized to receive end 12 of detent 10. The angular orientation of bore 11 and thus the stow position of ramp body 6 is user-selectable. In this respect, the stow position is dictated by the position of bore 11 along the length 17 of pivot bar 7 and the angular orientation of bore 11 relative to axis 18 of pivot bar 7. The angular orientation of pivot bar 7 is adjustable in clamps 8, 9. Detent 10 will only engage when ramp body 6 is in the exact stow position. Otherwise, end 12 of detent 10 will contact outer surface 24 of pivot bar 7. In order to disengage the end 12 of detent 10 from bore 11 of pivot bar 7, detent 10 must be manually lifted by the user.

In contrast to the prior art, the inventive loading ramp assembly has several novel benefits. The first novel feature is the aftermarket nature of the product as compared to prior art ramp solutions. In this respect, the present invention loading ramp assembly can be securely attached to a cargo vehicle without the need for welding the assembly or any constituent parts to the cargo vehicle. This allows the purchaser of a cargo vehicle the flexibility of purchasing the cargo vehicle without a permanently affixed ramp or gate. As noted, the end user currently has two ramping solution options. The first is the integral trailer gate. This solution requires driving with the gate or ramp at all times. Also, with the integral gate, when heavy wheeled vehicles want to be loaded on the platform of the vehicle, the typical wire-mesh gate may not be robust enough to accommodate such vehicles. In fact, the wire mesh gate may actually prevent usage of more robust ramps. The second solution involves using independent trailer ramps. These ramps will need to be individually stowed while traveling. These ramps will also need to be secured to the cargo vehicle to prevent movement during travel or theft during times the cargo vehicle is simply parked.

The integrated stowing feature of the present invention loading ramp assembly eliminates the issue of having to find a place to stow and secure individual loose ramps for local trips. The fact that the ramp assembly is removably attachable to the floor of the cargo vehicle means that the user has the option of removing the ramp assemblies for longer trips where upwardly stowed ramps would create fuel economy and handling issues due to the aerodynamic issues with the vertically configured ramps moving at highway speeds. Additionally, the fact that, in the preferred embodiment, clamps 8, 9 are each configured into the clamped configuration via one or more tool-driven fasteners enhances the theft resistance of the assembly 1 and ramp body 6.

Another benefit is obtained using the spring actuated detent and pivot bar. As described above, the pivot bar can be rotated 360 degrees and thus can orient the detent-engaging bore into any angular position. By virtue of this feature, and unlike prior art devices, the ramp bodies can be stowed at any angle as compared with the deck of the cargo vehicle. In addition, the construct of the detent and complementary bore allow for easy stowage of the ramp body at a desired position because the detent will only engage the bore when the ramp body is in the proper position achieved by aligning the detent with the bore. In any other position, the detent will not engage the bore because of the design geometry and angular position of the pivot bar. Additionally, as noted, because the ramp body is slidable upon a portion of the pivot bar, the ramp body can move inwardly and outwardly along the loading edge of the cargo vehicle depending upon the wheel track of the vehicle being loaded. In this respect, unlike the ramp solutions of the prior art, the present invention ramp solutions can handle a broad variety of vehicles such as ATVs, farm equipment, lawn equipment, golf carts, cars, motorcycles and construction vehicles.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application.

What is claimed is:

1. A loading ramp assembly for attachment to a cargo vehicle having a floor, the loading ramp assembly comprising:
    a ramp body, a pivot bar, a first clamp and a second clamp;
    the ramp body including a detent;
    the pivot bar including a bore sized and shaped to receive the detent;
    the first clamp being disposed on a first side of the pivot bar;
    the second clamp being disposed on a second side of the pivot bar;
    the ramp body having a proximal end and a distal end;
    the proximal end of the ramp body being rotatably connected to the pivot bar at a position on the pivot bar between the first clamp and the second clamp, the ramp body being rotatable on the pivot bar from a loading position to a stowed position;
    the first clamp and second clamp assuming a loosened configuration and clamped configuration;
    in the loosened configuration the pivot bar is rotatably positionable such that the bore can assume a selected angular orientation and in the clamped configuration, the first clamp and second clamp apply a clamping force to the pivot bar that holds the pivot bar in a clamped position and maintains the bore in the selected angular orientation;
    the first clamp and second clamp each including one or more fasteners, the one or more fasteners removably fastening the first clamp and second clamp to the floor; and
    when the ramp body is rotated about the pivot bar and the detent is aligned with the bore, the detent engages the bore in the bore's selected angular orientation and holds the ramp body in the stowed position.

2. The loading ramp assembly of claim 1 wherein the pivot bar has a length and the ramp body is slidable along a portion of the length of the pivot bar.

3. The loading ramp assembly of claim 1 further including a transition flap pivotably connected to the proximal end of the ramp body, the transition flap extending from the ramp body to the floor when the ramp body is in the loading position.

4. The loading ramp assembly of claim 2 further including a transition flap pivotably connected to the proximal end of the ramp body, the transition flap extending from the ramp body to the floor when the ramp body is in the loading position.

5. The loading ramp of claim 1 wherein the first clamp and the second clamp are each configured into the clamped configuration via one or more tool-driven fasteners.

6. The loading ramp of claim 2 wherein the first clamp and the second clamp are each configured into the clamped configuration via one or more tool-driven fasteners.

7. The loading ramp of claim 3 wherein the first clamp and the second clamp are each configured into the clamped configuration via one or more tool-driven fasteners.

8. The loading ramp of claim 4 wherein the first clamp and the second clamp are each configured into the clamped configuration via one or more tool-driven fasteners.

\* \* \* \* \*